(12) United States Patent  
Walton

(10) Patent No.: US 6,269,009 B1  
(45) Date of Patent: Jul. 31, 2001

(54) COMPACT POLYPHASE ELECTRICAL POWER CONVERTER HAVING A SINGLE FERROMAGNETIC CORE

(76) Inventor: John Hugh Davey Walton, 25 Shorncliffe Crescent, Folkestone, Kent, CT20 3PF (GB)

(\*) Notice: Subject to any disclaimer, the term of this patent is extended or adjusted under 35 U.S.C. 154(b) by 0 days.

(21) Appl. No.: 08/935,888

(22) Filed: Sep. 23, 1997

(51) Int. Cl.⁷ ........................................ H02M 7/48
(52) U.S. Cl. ............................................ 363/5; 363/64
(58) Field of Search ........................ 363/2, 3, 50, 40, 363/64, 154, 155

(56) References Cited

U.S. PATENT DOCUMENTS

| | | | |
|---|---|---|---|
| 3,118,106 | * 1/1964 | Robinson | 363/2 |
| 4,148,321 | 4/1979 | Wyss et al. | 128/420 A |
| 4,255,784 | * 3/1981 | Rosa | 363/64 |
| 4,346,715 | 8/1982 | Gammell | 128/422 |
| 4,683,527 | * 7/1987 | Rosa | 363/5 |
| 4,785,829 | 11/1988 | Convert et al. | 128/804 |
| 4,876,634 | * 10/1989 | Paice | 363/64 |
| 5,068,774 | * 11/1991 | Rosa | 363/3 |
| 5,148,357 | * 9/1992 | Paice | 363/5 |
| 5,383,917 | 1/1995 | Desai et al. | 607/702 |
| 5,620,481 | 4/1997 | Desai et al. | 607/101 |

FOREIGN PATENT DOCUMENTS

| | | | |
|---|---|---|---|
| 0 236 285 A2 | 9/1987 | (EP) | A61N/1/32 |
| 432656 | 7/1935 | (GB) . | |
| 1 592 999 | 7/1981 | (GB) | A61N/1/40 |
| 0128076 | 8/1988 | (GB) . | |
| 2 281 863 | 3/1995 | (GB) | A61N/1/32 |
| WO 83/01902 | 6/1983 | (WO) | A61N/1/00 |

\* cited by examiner

*Primary Examiner*—Jeffrey Sterrett

(57) ABSTRACT

A polyphase generator for medical diathermy apparatus comprises a ferromagnetic ring core bearing two primary windings each of which has two winding portions positioned diametrically opposite one another. The winding portions in each case are connected in series and are wound such that they create opposing magnetic effect which substantially cancel one another. Two primary windings are positioned substantially at right angles to one another. A plurality of secondary windings are arranged on the core to supply output terminals. A direct current supply may be connected via switching means to induce a resonant signal within the primary windings to generate a polyphase output at the terminals for use in application to electrodes of diathermy apparatus operating in excess of 200 kHz.

14 Claims, 3 Drawing Sheets

COMPACT POLYPHASE ELECTRICAL POWER CONVERTER HAVING A SINGLE FERROMAGNETIC CORE

BACKGROUND OF THE INVENTION

1. Field of the Invention

This invention relates to polyphase electrical generators and is applicable particularly to apparatus for generating power in the form of alternating electrical voltages between pairs of electrical output terminals, wherein each of said pairs of terminals may be isolated from others of said pairs and wherein the magnitudes and relative phases of the currents flowing between said pairs of output terminals, when loads are applied, are predeterminable.

2. Description of the Related Art

In the prior art two or more transformers may be driven from a single alternating current power source, which may itself be of a polyphase type, or else from a single phase source through phase shifting components such as capacitors. In either event it is possible for each pair of a plurality of pairs of output terminals to be linked by a plurality of winding turns connected in series, said turns being wound in appropriate number upon each of said transformer cores so that each turn makes a voltage contribution from the particular transformer core upon which it is wound. Between each of said pairs of terminals there will then exist a resultant voltage, formed by the vector addition of voltages from the said individual turns.

By choosing for each pair of terminals appropriate numbers of turns, wound upon one or more of said transformer corers, a voltage of any desired magnitude and phase can be obtained. However without the mechanical complication of movable coils, selection or variation of phase is available only in coarse steps corresponding to one winding turn.

This type of generator may well be complex and bulky, containing many junctions between individual windings: these are undesirable where a high degree of electrical isolation is called for. A particular example is diathermy used in electro-surgery, where the patient must be well protected from currents flowing to earth and also from any currents derived from low frequency power supplies.

BRIEF SUMMARY OF THE INVENTION

According to one aspect of this invention there is provided an electrical polyphase generator comprising:

output means across which polyphase alternating voltages are to be generated;

a ferromagnetic ring core;

two primary windings on said core and each comprising a pair of substantially diametrically opposed primary sections connected in series and wound substantially to cancel their net magnetic effect around the circumference of said core, the said primary windings mounted with respect to two orthogonal planes so as to possess minimum mutual inductance one to another;

means for supplying to said primary windings alternating currents in quadrature; and secondary windings electrically isolated from the primary windings and each mounted on said core and coupled to feed said output means, each secondary winding having an angular position on the core determining the phase of voltage induced in that secondary winding.

It is thus possible, in one variation, to provide a single ferromagnetic transformer core with windings in an arrangement which firstly lends itself to the construction of a compact two or more phase resonant power converter and, secondly, can afford a large multiplicity of different output phases using only a single insulated secondary winding for each of a plurality of pairs of output terminals.

Preferably each of said pairs of primary coils is coupled to capacitance to form therewith a resonant circuit and said resonant circuits may be independently tuned to a desired operating frequency.

This arrangement is possible because magnetic flux will be present in the said ferromagnetic ring core mainly beneath the winding turns which carry current at the time, returning in the form of a stray field which leaves said ring core and flows parallel to the axis of the coil. Thus there will be stored energy associated with each primary coil in the manner of a solenoid, even though neither primary winding creates net magnetic force around the core periphery. Such an arrangement contrasts with a conventional toroidal transformer.

One may supply power to the two primary windings so that each maintains as closely as possible a sinusoidal voltage across itself, these two voltages being in quadrature. Given that said primary windings can both resonate at a required working frequency—preferably of 200 kHz or above e.g. about at least 500 kHz, this may be achieved by using semiconductor or vacuum tube switches which connect each of said primary windings across a direct current power supply for a small proportion of the required cycle time, said primary windings being connected alternately and also the polarity of connection being reversed on each occasion. Between such periods of connection a sinusoidal pattern of magnetisation is maintained by current which flows through the capacitance coupled to each secondary winding.

Preferably, the supplying means comprises switching means arranged to operate at 4 n times (where n is an integer>0) said operating frequency to connect the extremities of said primary windings sequentially to an electrical power source so that substantially equal sinusoidal currents will flow through said primary windings in quadrature relationship, and substantially sinusoidal voltages will be induced in the secondary windings.

The superposition of the two patterns of magnetic flux generated respectively by said two primary windings will constitute a non-uniform magnetisation of the said ferromagnetic ring core which is equivalent to the magnetisation which would be produced were a single pair of primary windings to be energised with direct current and their mounting plane physically rotated about the axis of said ferromagnetic ring core at the rate of one revolution per cycle of alternating current generated. Such physical rotation would of course be impracticable at the frequency required for applications such as surgical diathermy and so it is useful that the same result can be achieved by the described construction.

Given the set of primary windings already described, a secondary conductor may be threaded through the said ferromagnetic core and if it is formed into a complete turn wrapped around any particular location on the circumference of said core, that secondary conductor will be incompletely coupled to both of said primary windings. It will have generated in it an induced voltage which varies in phase according to its angular position around the circumference of said ferromagnetic core with respect to said primary windings and hence according to the proportions of the magnetic fields created by each of said primary windings which are intercepted.

By providing secondary coils, each of a required number of turns and positioned suitably around the circumference of a ring-shaped ferromagnetic core and each wired between a pair of output terminals, it becomes possible to accommodate almost any number of output terminals and phase differences.

BRIEF DESCRIPTION OF THE SEVERAL VIEWS OF THE DRAWINGS

For a better understanding of the invention, and to show how the same may be carried into effect, reference will now be made, by way of example, to the accompanying drawings, in which.

DETAILED DESCRIPTION OF THE INVENTION

Figure 1:
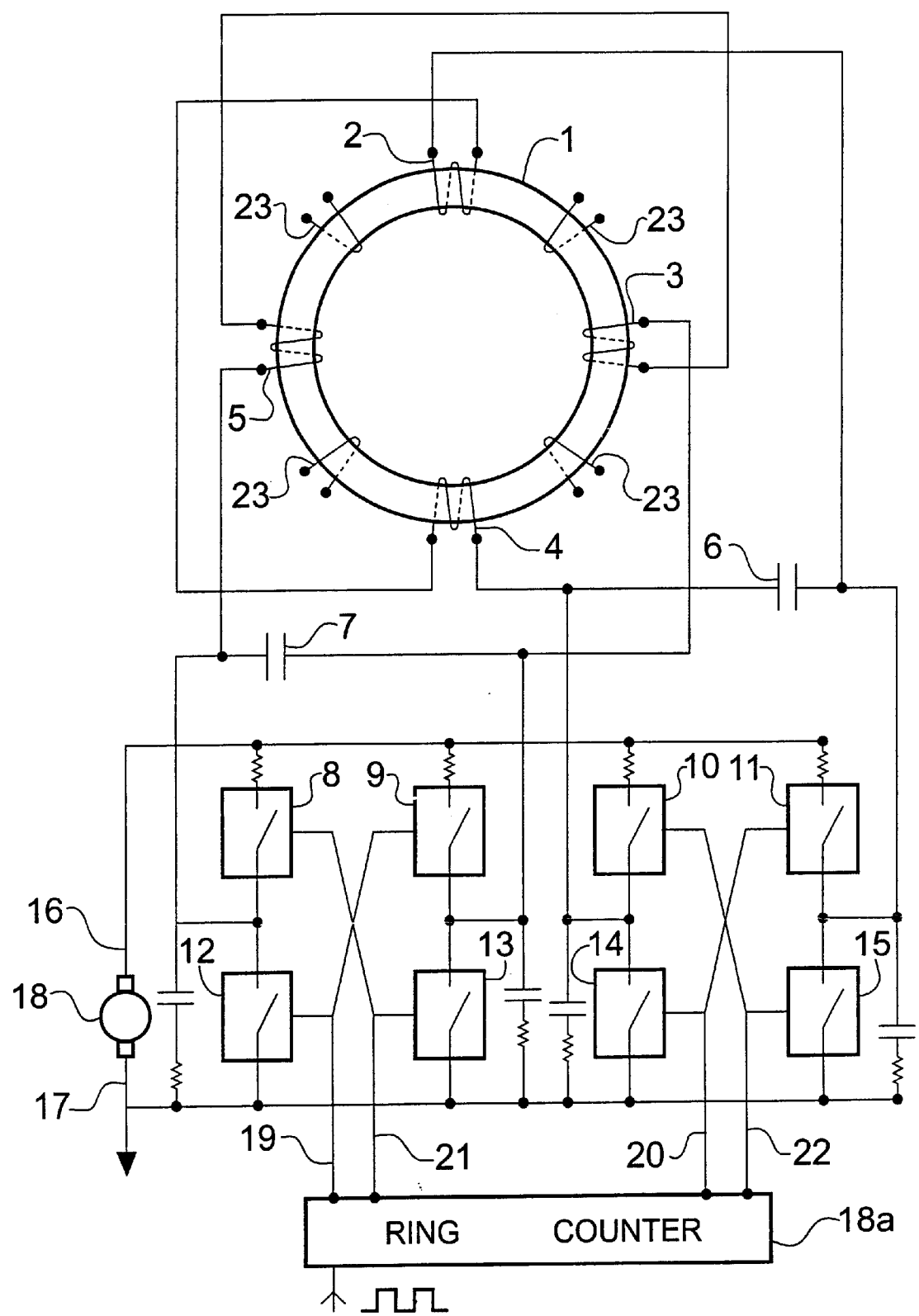
FIG. 1 is a circuit diagram of a first embodiment of polyphase generator.

A first embodiment is illustrated by FIG. 1, wherein a ferromagnetic ring core 1 is provided with four equally spaced substantially identical windings numbered 2 to 5, of which windings 2 and 4 are connected directly in series opposition so as to constitute one primary winding producing no net magneto-motive force round the circumference of the ring core 1. A capacitor 6 is connected across windings 2 and 4 in series, the aggregate inductance of which windings resonates with capacitor 6 at a desired operating frequency. Windings 3 and 5 are similarly connected so as to resonate with capacitor 7.

Electronic switches 8 to 15 connect the terminals of capacitors 6 and 7 to the opposing poles 16 and 17 of a direct current supply 18, control electrodes of said electronic switches being linked in pairs to control inputs 19 to 22 inclusive so that no one control input can cause a short circuit of supply 18. Driving circuits 18a cause the control inputs 19 to 22 to be energised in the set sequence 19, 20, 21, 22 with intervening "off" periods, which repeats so that the time for a whole cycle corresponds with the nominally equal resonant frequencies of the windings 2 and 4 with capacitor 6, and of windings 3 and 5 with capacitor 7. "The action of the driving circuit at 18A is to be understood by reference to the corresponding box 43 of FIG. 2 with its corresponding control inputs 48, 50, 52, 54."

Insulated secondary windings 23 (e.g. 4 or 8 windings) placed in desired angular positions on the ferromagnetic ring core 1 generate across pairs of output terminals voltages at the operating frequency which differ in phase. In practice a desirable arrangement comprises more than two windings, which may be symmetrically placed on the ring core 1. The secondary windings 23 may be mounted on formers slidable on the core 1 so that the output phases can be adjusted during assembly or during use. They may be secured in place after adjustment by any suitable means.

These secondary windings are independent and isolated from one another and from the primary windings. It is further possible, instead of the said pairs of output terminals being independent, to connect said secondary windings together in a star or delta arrangement in order to constitute a single polyphase power source.

FIG. 1 also shows various resistors and capacitors as an indication of means whereby, in a practical situation, deviations from a substantially sinusoidal waveform and attendant peak currents might be minimised by one skilled in the art of transformer construction.

In an alternative arrangement of windings, each primary winding is replaced by a pair of closely coupled bifilar windings to provide a balanced arrangement with a centre tap. Thereby, the two centre taps can remain permanently connected to one pole of a DC power supply, the four free ends of the said c(composite) primary windings being connected in rotation to the opposite supply pole. Here four electronic switches will suffice to achieve the required pattern of energisation with time.

Figure 2:
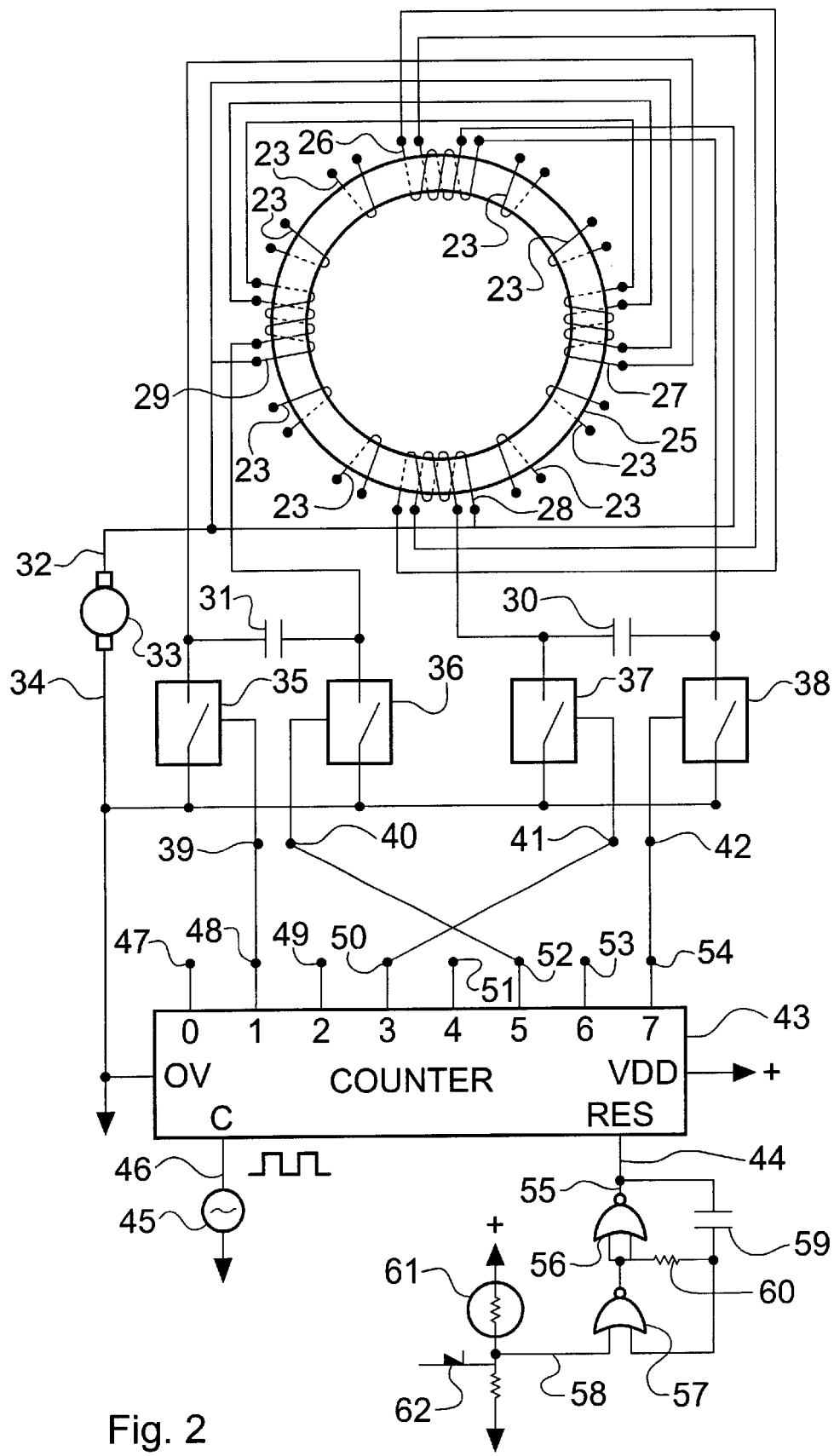
FIG. 2 is a circuit diagram of a second embodiment of polyphase generator.

FIG. 2 depicts this alternative arrangement of windings and semiconductor switches. The various resistors and capacitors such as shown in FIG. 1 would be equally applicable here and are thus not shown for clarity. A ferromagnetic ring core 25 is provided with four bifilar windings 26 to 29 such that the two primary windings created by series connection of diametrically opposed winding sections, as in FIG. 1, may be centre-tapped while the two halves of each primary winding so created remain closely coupled. This would not be the case if the individual windings of FIG. 1 were to be separated by a centre tap.

Capacitors 30 and 31 are connected to form a resonant circuit with their corresponding primary windings, created by series connection as shown. The centre tap of each primary winding is connected to one pole 32 of a direct current supply 33, the opposing pole 34 of which is connected to semiconductor switches 35 to 38 whose control inputs 39 to 42 fulfill the same function as control inputs 19 to 22 in FIG. 1.

The control inputs can be driven by an electronic counter to provide the required pattern of power levels and magnetisation, noting that, without a bifilar winding arrangement, eight electronic switches would be required to be connected in pairs to said electronic counter.

In a preferred arrangement using bifilar primary windings, a master oscillator 45 operates at eight times the required operating frequency and drives a binary ring counter 43. Four semiconductor switches are actuated respectively by outputs 1, 3, 5 and 7 of the said counter and link the four ends of said primary windings intermittently to one pole of a DC supply. The two centre taps of said primary windings are connected together to the opposite pole of said supply. The design of a commercially available 8-way binary ring electronic counter 43 such as the industry standard type 4022 is such that at no time can two different outputs become energised simultaneously.

FIG. 2 shows how switches 35 to 38 are controlled by the outputs of the 8-way binary ring counter 43. Said ring counter has a reset input 44 which forces a count of zero, whereby a voltage output exists at the "zero" output 47 alone.

Hence, on applying a "reset" voltage to the counter its "zero" output alone is energised and no power is drawn from the supply. With the counter running, the two resonant circuits are energised with a quadrature phase difference so that outputs of any required magnitude and phase are obtainable from secondary windings positioned as already described.

When said reset input voltage is removed, an alternating voltage applied by generator 45 to count input 46 causes sequential voltage outputs to occur at each of the counter outputs 47 to 54 each lasting for one eighth the period of a complete cycle. The counter outputs 48, 50, 52 and 54 when they occur each switch on one of the switches 35 to 38 for a period corresponding to 45 degrees of a 360 degree cycle.

With reference to radio frequency amplifier technology known in the prior art, it will be recognised that the arrangement described above constitutes a pair of class C amplifiers whose conduction angle is fixed at 45 degrees. An improved arrangement provides that at least four of the said semiconductor switches, for example MOSFET transistors, are controlled via an AND gate, the second input of which is controlled by a common pulse of variable length synchronised to the said master oscillator. This arrangement allows the proportion of the cycle during which each of the said semiconductor switches conducts to be variable and thus not only is it independently controllable but also it is adaptable to offset the effects of variable load upon the system.

It will be seen that reset input 44 of ring counter 43 functions as a power on-off switch. Thus in a further improvement to this invention, a low frequency square wave is continually applied to the reset input of the said binary counter. This causes the power generation to be periodically interrupted so that measurements can be interposed which might be affected by the presence of radio frequency power, such as temperature checks during the progress of surgical diathermy.

In a preferred arrangement, the said low frequency square wave is applied via a monostable trigger circuit which after delivering an energy pulse of known length, requires to be returned to a starting condition by the output of a temperature sensor, said output being absent if said temperature exceeds a predetermined limit.

FIG. 2 illustrates how the output 55 of a conditionally monostable circuit built using 2-input NOR gates 56 and 57 may be connected to reset input 44 so that, in the stable condition with input 58 at logic high, no power output results. The effect of maintaining input 58 at logic low is for repetitive pulses of power generation to take place (much greater than the cycle time of the ring counter 43 and typically of the order of one second as determined by resistor 60 and capacitor 59) with intervening periods of interruption. Input 58 is shown to be at a voltage controlled by a temperature sensor 61 to give a form of thermostatic control. Safety conditions, such as the presence of electrical power at an undesired location, may also be arranged to cause inhibition by taking input 58 to logic high via diode 62.

Figure 3:
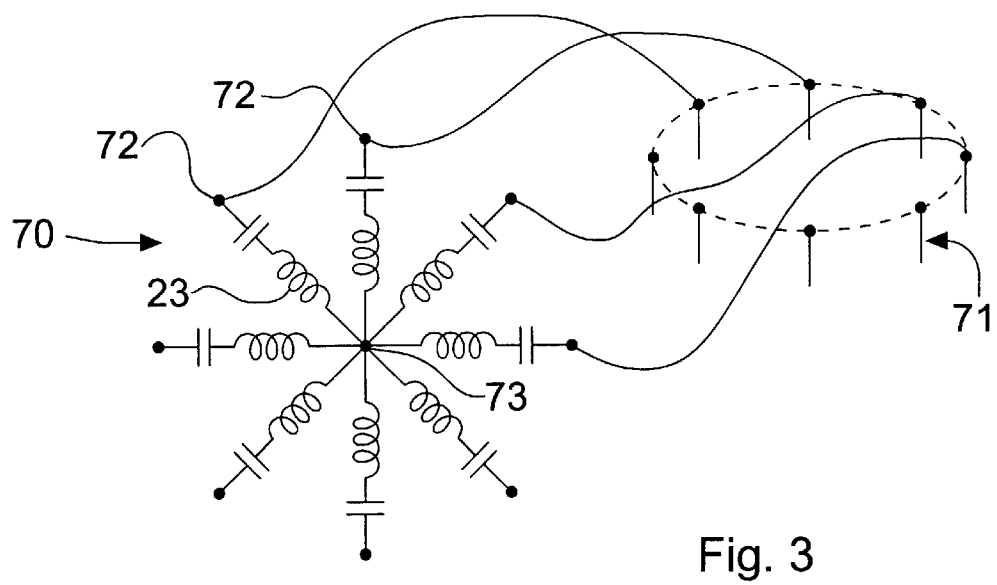
FIG. 3 is a circuit diagram illustrating a star configured diathermy apparatus.

FIG. 3 diagrammatically represents medical equipment in this case in the form of apparatus for surgical diathermy, being apparatus for causing high frequency electric currents to pass through living tissue in order to generate heat. This may be for the purpose of cutting or destroying it, or for causing a local temperature rise the effect of which will be selectively to degrade infections or tumour cells. Such apparatus might be generally as disclosed in UK Patent Specification No. GB-A-2281863, the content of which is hereby incorporated by reference. In such an example, the frequency of operation will be in excess of 200 kHz in order to cause only heating.

If a patient on an operating table is connected by means of an extensive conducting (normally metal) pad to one pole of a high frequency current generator operating at a frequency in excess of 200 kHz, and typically at least 500 kHz, the other pole of the generator can be connected to a cylindrical or needle-type electrode applied to an area of tissue which requires to be heated. This process is known as diathermy and more details may be ascertained from GB-A-2281863. Such heating tends however to be localised along restricted paths or in the neighbourhood of the electrodes. When it is required to effect the relatively uniform heating of a volume of tissue, a plurality of electrodes may be implanted with a view to electric currents flowing along multiple paths between them, these electrodes being desirably energised by alternating voltages which differ from one another in phase.

FIG. 3 shows at 71 a ring of 8 such electrodes coupled to respective output terminals 72 of a polyphase generator 70 in accordance with FIG. 1 or FIG. 2. The electrodes are held in a holder, shown by dotted lines, which maintains a desired physical relationship between the electrodes in use. In this example the polyphase generator is represented by its secondary windings 23. In this embodiment a star-configuration is used; thus each winding is coupled between the associated terminal 72 and a common centre point 73, while capacitance is being used to DC-isolate the terminal 72 from the secondary windings 23.

Figure 4:
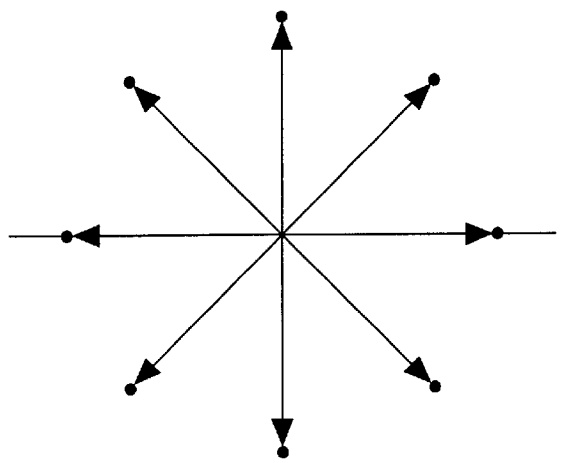
FIG. 4 is a vector diagram corresponding to FIG. 3.

FIG. 4 shows a vector diagram of the voltages induced in the windings 23 and in this example it is assumed that they are substantially regular and that the ends of the vectors lie approximately on a circle. This is not necessary but is illustrated in this figure for simplicity. The intention is that the free ends of the electrodes 71 will be placed so as to form a configuration corresponding substantially to the configuration represented by the dots drawn at the ends of the vectors of FIG. 4.

Figure 5:
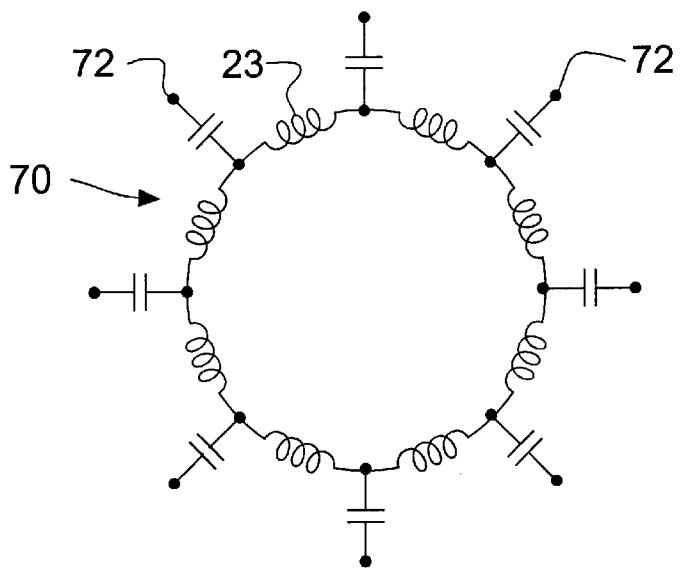
FIG. 5 is a circuit diagram of a delta configured diathermy apparatus.

FIG. 5 shows an alternative form of the diathermy apparatus 70 in which the windings 23 are connected in series and the terminals 72 are coupled by capacitance to the junctions between the secondary windings, thus providing a delta arrangement. The vector diagram of FIG. 4 applies equally to the voltage differences between the terminals 72. The electrodes 71, coupled with respective electrodes 72, will be arranged according to the pattern determined by the ends of the vectors, as shown in FIG. 4.

What is claimed is:

1. An electrical polyphase generator comprising:
   output means across which polyphase alternating voltages are to be generated;
   a single ferromagnetic ring core;
   two primary windings on said core, each positioned to create a magneto-motive force around the circumference of said ring core and each comprising a pair of substantially diametrically opposed primary sections connected in series and wound substantially to cancel said magneto-motive force, the said primary windings being mounted with respect to two orthogonal planes so as to possess minimum mutual inductance one to another;
   means for supplying to said primary windings alternating currents in quadrature; and
   secondary windings electrically isolated from the primary windings and each mounted on said core and coupled to feed said output means, each secondary winding having an angular position on the core determining the phase of voltage induced in that secondary winding.

2. A generator according to claim 1, wherein said primary windings are provided with parallel capacitance forming respective resonant circuits both tuned to a given operating frequency.

3. A generator according to claim 2, wherein the supplying means comprises switching means arranged to operate at 4 n times (where n is an integer>0) said operating frequency to connect the extremities of said primary windings sequentially to an electrical power source so that substantially equal sinusoidal currents will flow through said primary windings in quadrature relationship, and substantially sinusoidal voltages will be induced in the secondary windings.

4. A generator according to claim 3, wherein the switching means comprises an electronics switching means and an electronic counter having count outputs for actuating the electronic switching means by said count outputs of said electronic counter.

5. A generator according to claim 4, and comprising means for cyclically imposing a reset condition upon the electronic counter, and means responsive to a physical parameter to remove the reset condition.

6. A generator according to claim 2, wherein each of said primary windings is a winding of a bifilar conductor and each primary winding has a tapping point and comprises two series combinations of diametrically opposed primary coils symmetrical about said tapping point with a winding sense such that the inductances of adjacent bifilar conductors, connected in series, are additive, the tapping points of said primary windings connected to one pole of a direct current supply and the switching means being operable to connect the extremities of said primary windings sequentially to an opposite pole of the direct current supply.

7. A generator according to claim 6, wherein the switching means comprises an electronics switching means and an electronic counter having count outputs for actuating the electronic switching means by said count outputs of said electronic counter.

8. A generator according to claim 1 and having a plurality of said secondary windings connected in series with a consistent rotation of winding relative to the said core to form a polyphase power source of delta configuration.

9. A generator according to claim 1 and having a plurality of said secondary windings with one end of each of said secondary windings connected to a common point, there being a consistent rotation of winding passing from said common point through each of said secondary windings, to form a polyphase power source of star configuration.

10. A generator according to claim 1, wherein each of said primary windings is a winding of a bifilar conductor and each primary winding has a tapping point and comprises two series combinations of diametrically opposed primary coils symmetrical about said tapping point with a winding sense such that the inductances of adjacent bifilar conductors, connected in series, are additive.

11. An electrical polyphase generator comprising:
output means across which polyphase alternating voltages are to be generated:
   a single ferromagnetic ring core;
   two primary windings on said core, each positioned to create a magneto-motive force around the circumference of said ring core and each comprising a pair of substantially diametrically opposed primary windings connected in series and wound substantially to cancel said magneto-motive force the said primary windings being mounted with respect to two orthogonal planes so as to possess minimum mutual inductance one to another;

means for supplying to said primary windings alternating currents in quadrature whereby said primary windings are provided with parallel capacitance forming respective resonant circuits both tuned to a given operating frequency, and said supplying means comprises switching means arranged to operate at 4 n times, where n is an integer>0, said operating frequency to connect the extremities of said primary windings sequentially to a direct current electrical power source so that substantially equal sinusoidal currents will flow through said primary windings in quadrature relationships, and substantially sinusoidal voltages will be induced in the secondary windings, secondary windings electrically isolated from the primary windings and each mounted on said core and coupled to feed said output means, each secondary winding having an angular position on the core determining the phase of voltage induced in that secondary winding.

12. A generator according to claim 11 wherein the switching means comprises an electronic switching means and an electronic ring counter having count outputs for actuating the electronic switching means by said count outputs of said electronic counter, wherein the counter has a plurality of successively actuated count outputs of which alternate ones at most are coupled to said switching means, and the count output corresponding to the reset condition of said ring counter is not so coupled.

13. A generator according to claim 12, and comprising means for cyclically imposing a reset condition upon the electronic counter, and removing said reset condition subject to the measured value of a physical parameter exceeding or not exceeding a preset limit.

14. Apparatus according to claim 11, adapted to deliver a set of mutually interconnected but collectively isolated polyphase voltages at a frequency exceeding 200 Khz to electrodes mounted in a holder maintaining the electrodes in a given spatial relationship.

* * * * *